United States Patent
Lindqvist et al.

(10) Patent No.: US 11,770,830 B2
(45) Date of Patent: Sep. 26, 2023

(54) PROVIDING INFORMATION ON A CONTROL CHANNEL

(71) Applicant: Telefonaktiebolaget LM Ericsson (publ), Stockholm (SE)

(72) Inventors: Fredrik Lindqvist, Järfälla (SE); Robert Baldemair, Solna (SE); Jung-Fu Cheng, Fremont, CA (US); Sorour Falahati, Stockholm (SE); Havish Koorapaty, Saratoga, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 34 days.

(21) Appl. No.: 16/619,574

(22) PCT Filed: Jun. 5, 2018

(86) PCT No.: PCT/EP2018/064755
§ 371 (c)(1),
(2) Date: Dec. 5, 2019

(87) PCT Pub. No.: WO2018/224493
PCT Pub. Date: Dec. 13, 2018

(65) Prior Publication Data
US 2020/0137748 A1 Apr. 30, 2020

Related U.S. Application Data

(60) Provisional application No. 62/516,488, filed on Jun. 7, 2017.

(51) Int. Cl.
*H04W 72/21* (2023.01)
*H04L 5/00* (2006.01)
(Continued)

(52) U.S. Cl.
CPC ............ *H04W 72/21* (2023.01); *H04L 5/0051* (2013.01); *H04L 5/10* (2013.01); *H04L 27/2035* (2013.01);
(Continued)

(58) Field of Classification Search
None
See application file for complete search history.

(56) References Cited

U.S. PATENT DOCUMENTS

2008/0225822 A1* 9/2008 Zhang ..................... H04L 5/023
 370/343
2017/0048829 A1* 2/2017 Kim ....................... H04L 5/0092
(Continued)

OTHER PUBLICATIONS

International Search Report and Written Opinion of the International Searching Authority dated Sep. 11, 2018 Issued in PCT Application No. PCT/EP2018/064755 , consisting of 9 pages.
(Continued)

*Primary Examiner* — Srinivasa R Reddivalam
(74) *Attorney, Agent, or Firm* — Christopher & Weisberg, P.A.

(57) ABSTRACT

A method, wireless device and network node are configured to generate or process a control channel, having two multiplexed sequences based on a base sequence. In some embodiments, a method includes sampling even samples of the base sequence and modulating the sampled even samples to create a first control channel sequence. The method includes performing a second sampling of odd samples of the base sequence to create a second control channel sequence. The method also includes frequency division multiplexing the first and second control channel sequences to produce the control channel.

18 Claims, 10 Drawing Sheets

(51) Int. Cl.
  *H04L 5/10* (2006.01)
  *H04L 27/20* (2006.01)
  *H04L 27/227* (2006.01)
  *H04L 27/26* (2006.01)

(52) U.S. Cl.
  CPC ........ *H04L 27/227* (2013.01); *H04L 27/2607* (2013.01)

(56) References Cited

U.S. PATENT DOCUMENTS

| | | | |
|---|---|---|---|
| 2017/0093469 A1 | 3/2017 | Nayeb Nazar | |
| 2018/0192416 A1* | 7/2018 | Yin | H04L 1/1607 |
| 2018/0351724 A1* | 12/2018 | Wang | H04W 76/28 |
| 2019/0222254 A1* | 7/2019 | Kim | H04L 5/10 |
| 2019/0230647 A1* | 7/2019 | Yang | H04L 5/0051 |
| 2020/0037308 A1* | 1/2020 | Liu | H04L 5/0048 |
| 2020/0067680 A1* | 2/2020 | Nayeb Nazar | H04L 1/1692 |
| 2020/0092876 A1* | 3/2020 | Cho | H04W 72/0413 |
| 2020/0092880 A1* | 3/2020 | Choi | H04W 72/042 |
| 2020/0228289 A1* | 7/2020 | He | H04L 5/001 |

OTHER PUBLICATIONS

Huawei et al: "Structure of 1-symbol PUCCH for up to 2 bits.", 3GPP Draft; R1-1706950, 3rd Generation Partnership Project (3GPP), Mobile Competence Centre ; 650, Route Des Lucioles ; F-06921 Sophia-Antipolis Cedex ; France , vol. RAN WG1, No. Hangzhou, China; May 15, 2017-May 19, 2017 May 14, 2017 (May 14, 2017), XP051272180; consisting of pp. 7 pages.

Ericsson: "On the Design of 1-Symbol PUCCH for 1-2 bits UCI", 3GPP Draft; R1-1709080, 3rd Generation Partnership Project (3GPP), Mobile Competence Centre ; 650, Route Des Lucioles ; F-06921 Sophia-Antipolis Cedex ; France, vol. RAN WG1, No. Hangzhou, China; May 15, 2017-May 19, 2017 May 14, 2017 (May 14, 2017), XP051274238; consisting of pp. 6 pages.

3GPP TS 36.211 V8.9.0 (Dec. 2009), 3rd Generation Partnership Project; Technical Specification Group Radio Access Network; Evolved Universal Terrestrial Radio Access (E-UTRA); Physical Channels and Modulation (Release 8) consisting of 83 pages.

* cited by examiner

PROVIDING INFORMATION ON A CONTROL CHANNEL

CROSS-REFERENCE TO RELATED APPLICATIONS

This application is a Submission Under 35 U.S.C. § 371 for U.S. National Stage Patent Application of International Application No.: PCT/EP2018/064755, filed Jun. 5, 2018 entitled "PROVIDING INFORMATION ON A CONTROL CHANNEL," which claims priority to U.S. Provisional Application No.: 62/516,488, filed Jun. 7, 2017, entitled "ENHANCED SHORT PHYSICAL UPLINK CONTROL CHANNEL," the entireties of both of which are incorporated herein by reference.

TECHNICAL FIELD

The disclosure relates to providing information on a control channel having two multiplexed sequences based on at least one base sequence, the two multiplexed sequences including a first control channel sequence comprising modulated samples.

BACKGROUND

The new radio (NR) short physical uplink control channel (PUCCH) is to be designed for carrying 1 or 2 uplink control information (UCI) bits. See, for example 3GPP TR 38.802 v14.0.0. The format spans 1 or 2 symbols in time and (at least) 1 physical resource block (PRB) of 12 subcarriers in frequency. Two different format candidates are currently being discussed by the Third Generation Partnership Project (3GPP) standards body, namely sequence modulation and sequence selection, which are briefly summarized as follows.

Sequence Modulation

Sequence modulation uses frequency division multiplexing (FDM) of two assigned sequences, where one sequence is modulated by the uplink control information (UCI) while the other sequence consists of demodulation reference signals (DM-RS) (i.e., known pilots) to allow for coherent demodulation at the receiver. That is, the UCI is first mapped to a binary phase shift keyed/quadrature phase shift keyed (BPSK/QPSK) symbol which modulates (i.e., multiplies) an assigned sequence to be transmitted together with the frequency division multiplexed DM-RS sequence.

The sequence modulation format is shown in FIG. 1. As can be seen, the subcarriers of a PRB (12 subcarriers) are split into two combs, each of length 6, where one comb is used for DM-RS and the other comb is used for UCI. A DM-RS overhead of ½ is used since the targeted signal to noise ratio (SNR) is fairly low. Each user is assigned one cyclic shift for DM-RS and one cyclic shift for the UCI, for example semi-statistically configured by radio resource control (RRC), see for example 3GPP TS 38.331 V0.0.3. The multiplexing capacity is independent of UCI size and is up to 6 users per PRB, corresponding to a maximum 6 cyclic shifts of the base sequence.

Sequence Selection

In sequence selection, no DM-RS are transmitted and reception is therefore non-coherent. FIG. 2 depicts sequence selection. The sequences are assumed to be computer-optimized sequences as in Long Term Evolution (LTE). All users multiplexed on the same PRB are assigned the same base sequence but different cyclic shifts (CS). For 1-bit UCI, a user is assigned to 2 cyclic shifts and the multiplexing capacity is 6 users per PRB. For a payload of 2 bits, 4 cyclic shifts are needed per user and hence up to 3 users can be multiplexed on a single PRB.

The sequence selection (SS) format has low peak-to-average-power-ratio (PAPR) and low cubic metric (CM) which are desirable properties, especially for improving cell coverage. However, simulation results show loss of performance for SS on highly dispersive channels due to lack of coherent demodulation. Sequence modulation on the other hand provides coherent demodulation but generally lacks the desirable low PAPR and low CM and hence, suffers from reduced coverage.

SUMMARY

One of the problems addressed by the present application is how to provide information on a short control channel which provides coherent demodulation whilst maintaining a low peak-to-average power ratio (PAPR) and low Cubic metric(CM). As such, some embodiments advantageously provide a method and system for generation of a control channel that provides low PAPR/CM combined with coherent demodulation for 1 or 2 bit payloads. In some embodiments the sequence modulation format is enhanced by selecting the FDM scheme of two sequences, one for UCI and one for DM-RS, respectively, together with restricting the modulation to BPSK (i.e., also for 2 bit UCI). Multiple users can be multiplexed onto the same time-frequency resource by allocating additional cyclic shifts. In some embodiments, a 2 bit payload is transmitted with low PAPR/CM by using one bit to select a sequence and using the other bit to modulate the selected sequence. In some embodiments a further advantage is obtained by re-using the already agreed upon specified set of DM-RS sequences in LTE it is possible to minimize the specification impacts on New Radio (NR), and hence avoid the lengthy exercise of designing new low PAPR/CM sequences, are re-used.

Some embodiments include a wireless device for providing information on a control channel. The wireless device includes processing circuitry configured to sample even samples of the base sequence and modulating the sampled even samples to create a first sequence, perform a second sampling of odd samples of the base sequence to create a second sequence and frequency division multiplex the first and second sequences to produce the control channel transmission.

In some embodiments, the control channel transmission is a short physical uplink control channel, sPUCCH, transmission. In some embodiments, the modulating of the sampled even samples is by a binary phase shift keying, BPSK, symbol. In some embodiments, the BPSK symbol corresponds to a first of two bits of an uplink control information, UCI, symbol. In some embodiments, a second bit of an uplink control information, UCI, symbol having at least two bits determines one of two cyclic shifts of the base sequence. In some embodiments, the two cyclic shifts are based on a base cyclic shift received in downlink control information, DCI. In some embodiments, the base sequence is one of two base sequences selected by a bit of uplink control information, UCI, symbol. In some embodiments, the second control channel sequence includes a demodulation reference signal, DMRS.

Some embodiments include a wireless device for providing information on a control channel. The wireless device includes processing circuitry configured to sample even samples of the base sequence and modulating the sampled even samples to create a first sequence, perform a second sampling of odd samples of the base sequence to create a second sequence and frequency division multiplex the first and second sequences to produce the control channel transmission.

In some embodiments, the control channel transmission is a short physical uplink control channel, sPUCCH, transmission. In some embodiments, the modulating of the sampled even samples is by a binary phase shift keying, BPSK, symbol. In some embodiments, the BPSK symbol corresponds to a first of two bits of an uplink control information, UCI, symbol. In some embodiments, a second bit of an uplink control information, UCI, symbol having at least two bits determines one of two cyclic shifts of the base sequence. In some embodiments, the two cyclic shifts are based on a base cyclic shift received in downlink control information, DCI. In some embodiments, the base sequence is one of two base sequences selected by a bit of uplink control information, UCI, symbol. In some embodiments, the second control channel sequence includes a demodulation reference signal, DMRS.

Some embodiments include a method in a network node configured to process a received uplink control channel. The method includes frequency de-multiplexing a received control channel transmission to obtain a first control channel sequence and a second control channel sequence. The method includes obtaining a demodulation reference signal, DM-RS, from the second control channel sequence. The method also includes demodulating the first control channel sequence to obtain uplink control information.

In some embodiments, the uplink control channel transmission is a short physical uplink control channel, sPUCCH, transmission. In some embodiments, the first sequence is modulated by a binary phase shift keying, BPSK, symbol. In some embodiments, a first of two bits of the uplink control information, UCI, corresponds to a BPSK symbol. In some embodiments, a second bit of an uplink control information, UCI, symbol having at least two bits determines one of two cyclic shifts of a base sequence. In some embodiments, the base sequence is one of two base sequences selected by a bit of uplink control information, UCI. In some embodiments, the method further includes transmitting a base cyclic shift in downlink control information, the base cyclic shift used by a wireless device to perform a cyclic shift of at least one of the first and second sequences.

Some embodiments include a network node configured to process a received uplink control channel transmission. The network node includes processing circuitry configured to frequency division de-multiplex a received control channel transmission to obtain a first control channel sequence and a second control channel sequence, obtain a demodulation reference signal, DM-RS, from the second control channel sequence, and demodulate the first control channel sequence to obtain uplink control information.

In some embodiments, the uplink control channel transmission is a short physical uplink control channel, sPUCCH, transmission. In some embodiments, the first control channel sequence is modulated by a binary phase shift keying, BPSK, symbol. In some embodiments, a first of two bits of the uplink control information, UCI, corresponds to a BPSK symbol. In some embodiments, a second bit of an uplink control information, UCI, symbol having at least two bits determines one of two cyclic shifts of a base sequence. In some embodiments, the base sequence is one of two base sequences selected by a bit of uplink control information, UCI, symbol. In some embodiments, the processing circuitry is further configured to transmit a base cyclic shift in downlink control information, the base cyclic shift used by a wireless device 16 to perform a cyclic shift of at least one of the first and second sequences.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
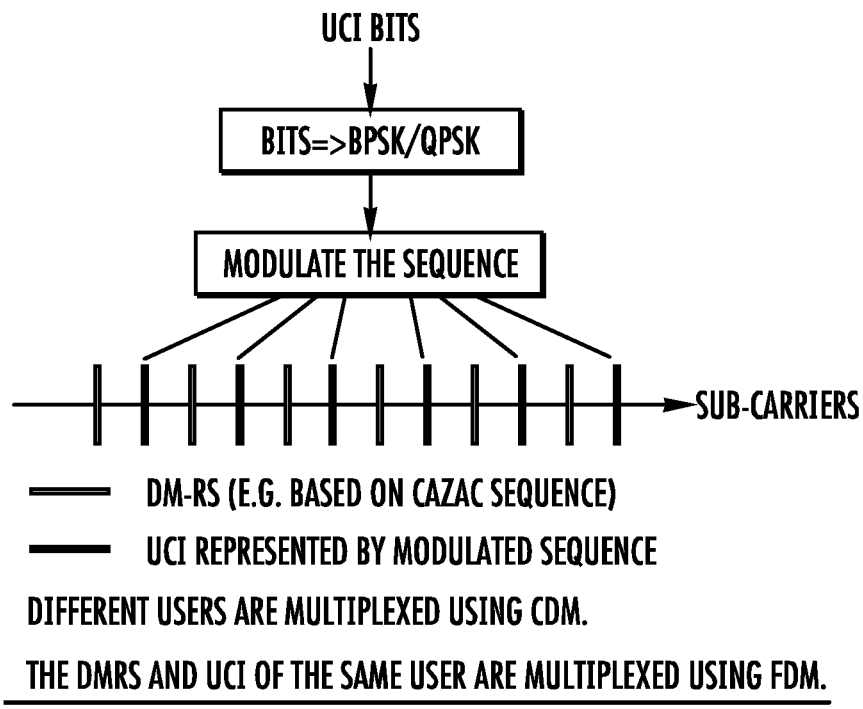
FIG. 1 is an illustration of sequence modulation construction of a PUCCH.
Figure 2:
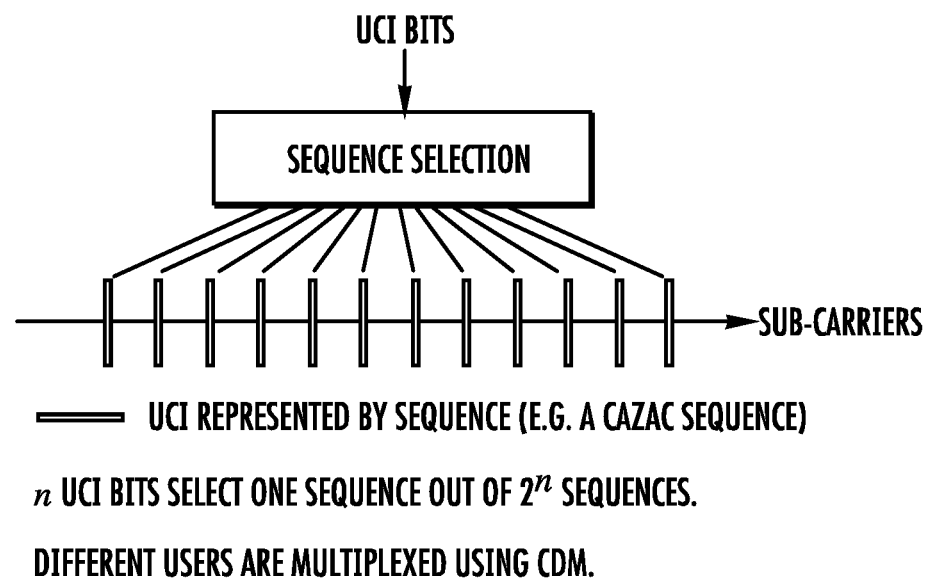
FIG. 2 is an illustration of sequence selection construction of a PUCCH.

Before describing in detail exemplary embodiments, it is noted that the embodiments reside primarily in combinations of apparatus components and processing steps related to providing an uplink control channel having two multiplexed sequences based on at least one base sequence, the two multiplexed sequences including a first sequence for carrying uplink control information (UCI) and a second sequence having a demodulation reference signal (DM-RS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Some embodiments include a wireless device 16 for providing information on a control channel having two multiplexed bit sequences based on a base sequence. In some embodiments a method in a wireless device for providing information on a control channel includes sampling even samples of a base sequence and modulating the sampled even samples to create a first control channel sequence. The method includes performing a second sampling of odd samples of the base sequence to create a second control channel sequence. The method also includes frequency division multiplexing the first and second control channel sequences to produce the control channel transmission. The first control sequence is described herein as being derived from 'even' samples of a base sequence and the second control sequence is derived from 'odd' samples of a base sequence, however this selection is arbitrary and does not limit the inventive concept. It would be obvious to the skilled person that deriving the first control sequence from 'odd' samples and deriving the second control sequence from 'even' samples would produce the same effects and technical advantages. An advantage being that coherent demodulation is improved since the second control channel sequence provides the receiver with a demodulation reference signal (DM-RS) whilst the modulated samples of the first control channel sequence provide a low peak-to-average power ratio (PAPR) and low cubic metric (CM) which are desirable properties especially for improving cell coverage. The above mentioned advantages can be achieved by selecting the FDM scheme of two sequences, one for UCI and one for DM-RS, respectively, together with restricting the modulation to BPSK (i.e., also for 2 bit UCI). Multiple users can be multiplexed onto the same time-frequency resource by allocating additional cyclic shifts. In some embodiments, a 2 bit payload is transmitted with low PAPR/CM by using one bit to select a sequence and using the other bit to modulate the selected sequence.

As used herein, relational terms, such as "first" and "second," "top" and "bottom," and the like, may be used solely to distinguish one entity or element from another entity or element without necessarily requiring or implying any physical or logical relationship or order between such entities or elements.

An indication may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signal such as PSS, SSS, CRS, PRS etc. The term physical channel (e.g., in the context of channel reception) used herein is also called a 'channel'. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc. These terms/abbreviations may be used according to 3GPP standard language, in particular according to LTE or NR.

For cellular communication there is provided at least one uplink (UL) connection with an associated channel and carrier and at least one downlink (DL) connection with an associated channel and carrier. A cell is defined which may be provided by a network node, in particular a base station, eNodeB in Long Term Evolution (LTE) or a gNodeB in New Radio (NR). An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated with different frequency resources, e.g., carriers and/or spectral bands. A cell may comprise at least one uplink carrier and at least one downlink carrier, which may have different frequency bands. A network node, e.g., a base station or eNodeB or gNB, may be adapted to provide and/or define and/or control one or more cells, e.g., a primary cell (PCell) and/or a licensed assisted (LA) cell.

Transmitting in the downlink may pertain to transmission from the network or network node to the terminal. Transmitting in the uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or LTE and/or NR technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE or NR standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Note that although terminology from the third generation partnership project, (3GPP) long term evolution (LTE) is used in this disclosure as an example, this should not be seen as limiting the scope of the disclosure to only the aforementioned system. Other wireless systems, including NR (i.e., 5G), wideband code division multiple access (WCDMA), WiMax, ultra mobile broadband (UMB) and global system for mobile communications (GSM), may also benefit from exploiting the concepts and methods covered within this disclosure.

Also note that terminology such as eNodeB, gNB and wireless device should be considered non-limiting and does in particular not imply a certain hierarchical relation between the two; in general "eNodeB" could be considered as device 1 and "wireless device" device 2, and these two devices communicate with each other over some radio channel. Also, while some of the principles of the disclosure focus on wireless transmissions in the downlink/uplink, they may be equally applicable in the uplink/downlink.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "radio network node" or "network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, gNodeB in New Radio (NR), multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Note further that functions described herein as being performed by a wireless device or a network node may be distributed over a plurality of wireless devices and/or network nodes.

Figure 3:
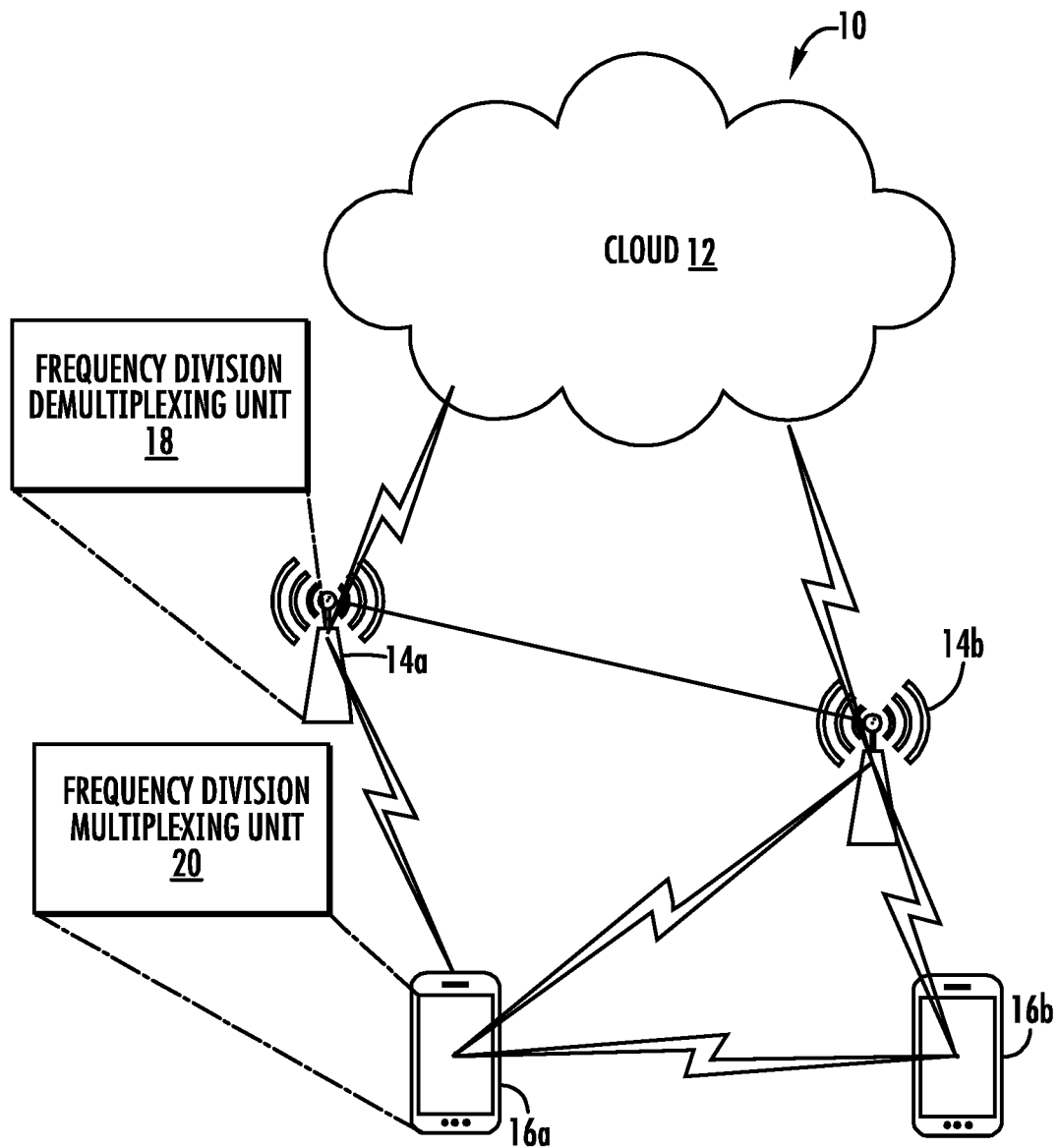
FIG. 3 is a block diagram of a wireless communication network configured according to principles set forth herein.

Returning to the drawing figures, FIG. 3 is a block diagram of a wireless communication network configured according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The network node 14 has a frequency division de-multiplexing unit or module 18 configured to frequency de-multiplex a received control channel, such as a short physical uplink control channel (sPUCCH), to obtain a first sequence and a second sequence. The first sequence is demodulated to obtain UCI from the wireless device 16 and the second sequence has DM-RSs. The wireless device 16 has a frequency division multiplexing unit or module 20 configured to frequency division multiplex the first and second sequences to produce the control channel that is transmitted to the network node 14 by the wireless device 16. After the demultiplexing the obtained DMRS signal can be used to estimate the channel from which coherent demodulation of the UCI can be achieved.

Figure 4:
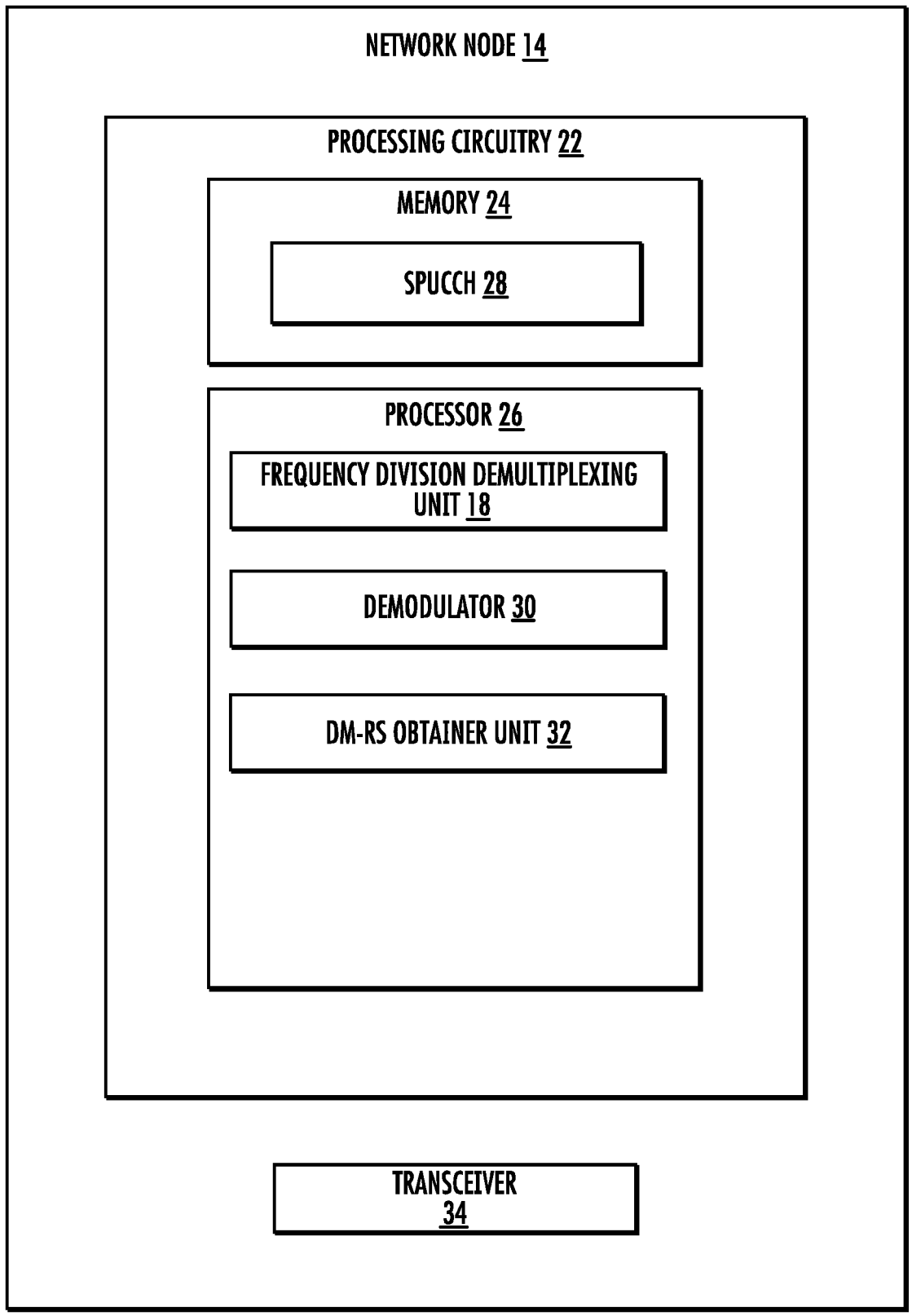
FIG. 4 is a block diagram of a network node configured according to principles set forth herein.

FIG. 4 is a block diagram of a network node 14 configured according to principles set forth herein. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store control channel information 28. In some embodiments, the control channel is a short physical uplink control channel (sPUCCH). The processing circuitry 22 is configured to implement a frequency division de-multiplexing unit 18 configured to frequency de-multiplex a received control channel to obtain a first control channel sequence and a second control channel sequence. A demodulator 30 is configured to demodulate the first control channel sequence to obtain uplink control information. A demodulation reference signal, DM-RS, obtainer 32 is configured to obtain a DM-RS from the second control channel sequence. A transceiver 34 is configured to receive the control channel information 28 from the wireless device 16. After the demultiplexing the obtained DMRS signal can be used to estimate the channel from which coherent demodulation of the UCI can be achieved.

Figure 5:
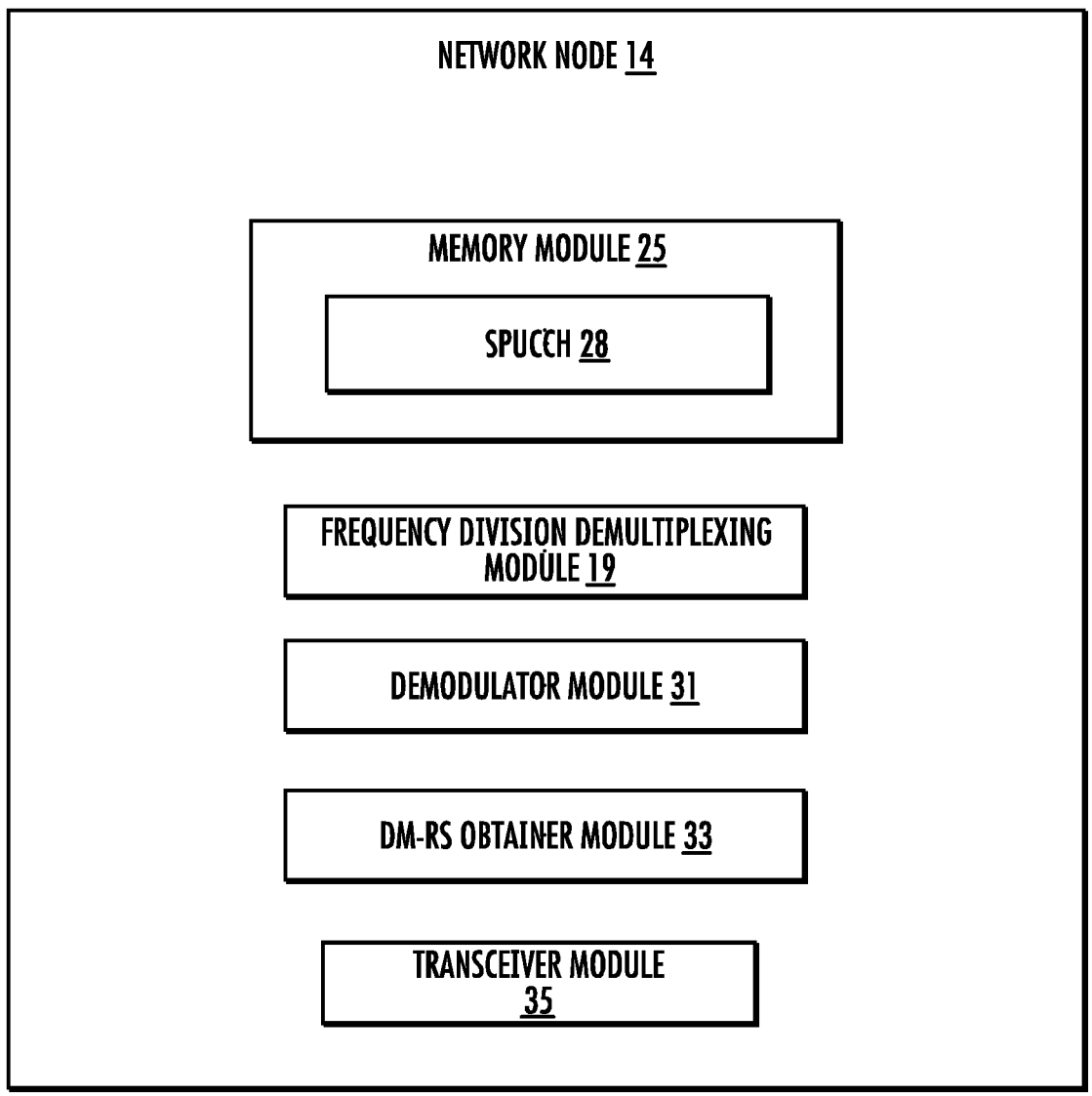
FIG. 5 is a block diagram of an alternative embodiment of a network node configured according to principles set forth herein.

FIG. 5 is a block diagram of an alternative embodiment of a network node 14 configured according to principles set forth herein. The memory module 25 includes the control channel 28. A frequency division de-multiplexing module 19 is configured to frequency de-multiplex a received control channel to obtain a first control channel sequence and a second control channel sequence. A demodulator module 31 is configured to demodulate the first control channel sequence to obtain uplink control information. A demodulation reference signal, DM-RS, obtainer module 33 is configured to obtain a DM-RS from the second control channel sequence. After the demultiplexing the obtained DMRS signal can be used to estimate the channel from which coherent demodulation of the UCI can be achieved.

Figure 6:
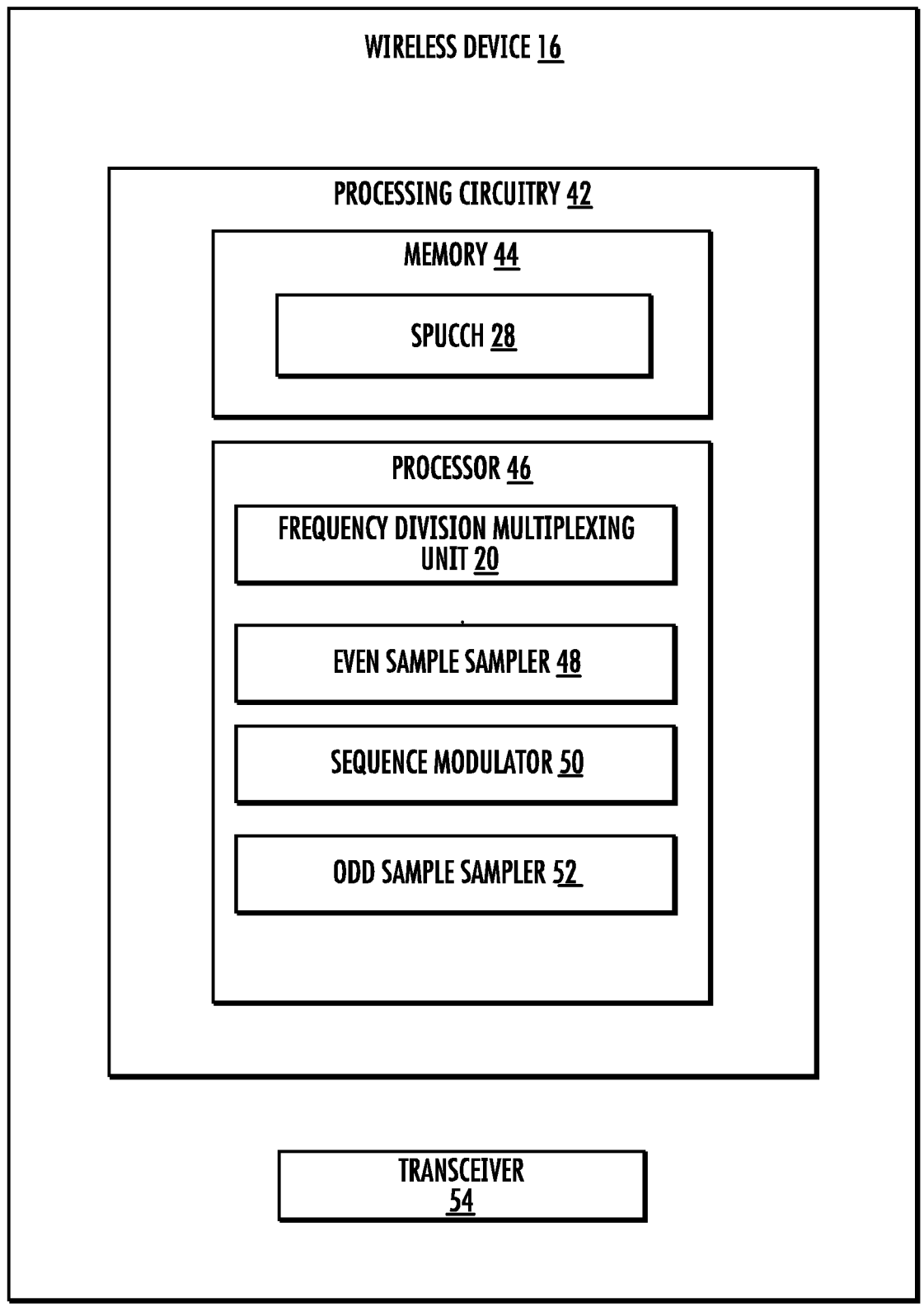
FIG. 6 is a block diagram of a wireless device configured according to principles set forth herein.

FIG. 6 is a block diagram of a wireless device 16 configured according to principles set forth herein. The wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may include integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may include a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store control channel 28 information. In some embodiments, the control channel is a short physical uplink control channel (sPUCCH). The processing circuitry 42 is configured to implement an even sample sampler 48 configured to sample even samples of the base sequence. The sequence modulator 50 is configured to modulate the sampled even samples to create a first control channel sequence. In some embodiments the modulation is with a binary phase shift keying, BPSK, symbol. The processing circuitry 42 also implements an odd sample sampler 52 configured to perform a second sampling of odd samples of the base sequence to create a second control channel sequence. The frequency division multiplex unit 20 is configured to frequency division multiplex the first and second control channel sequences to produce the control channel transmission. The transceiver 54 is configured to transmit the control channel information to the network node 14.

Figure 7:
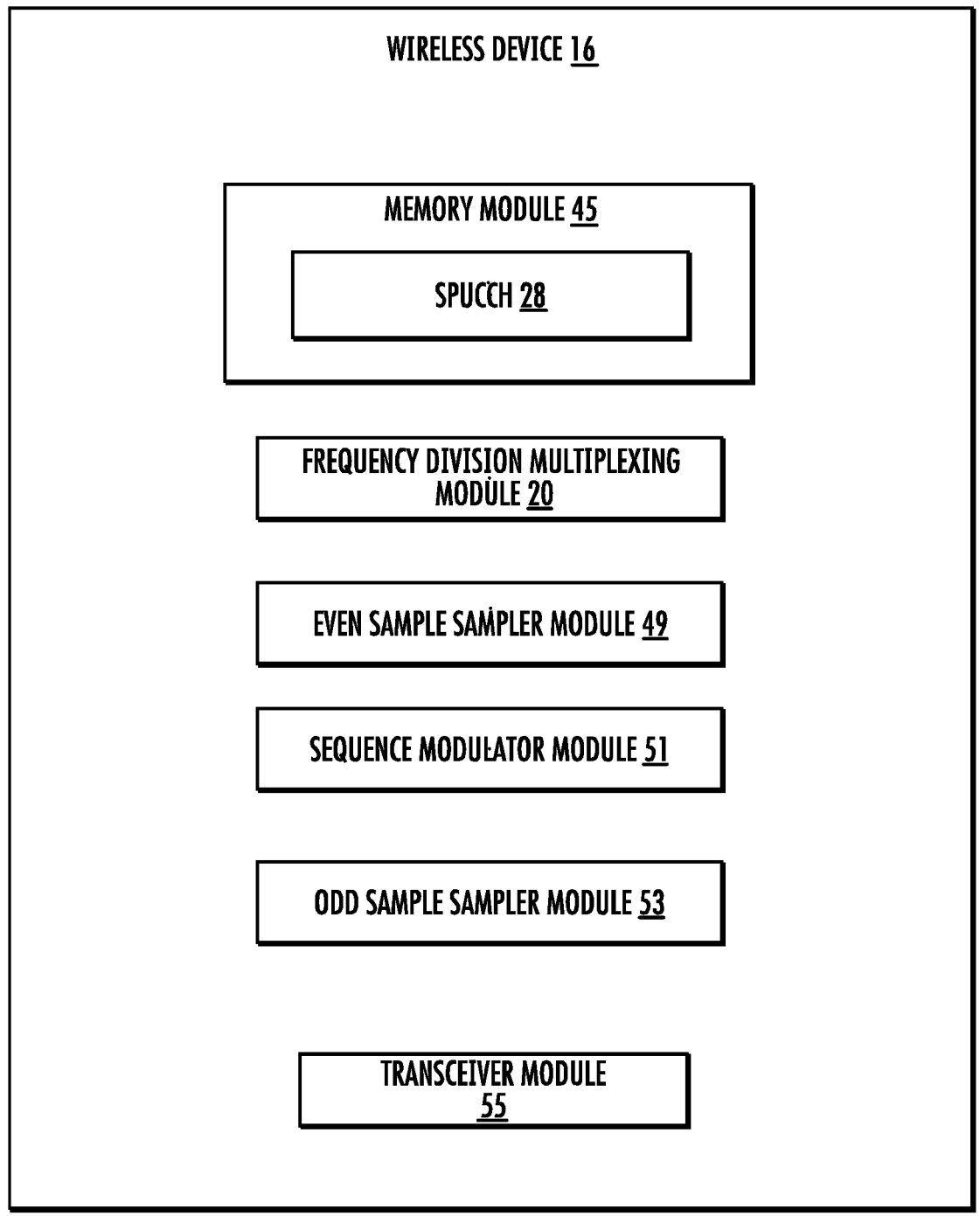
FIG. 7 is a block diagram of an alternative embodiment of a wireless device configured according to principles set forth herein.

FIG. 7 is a block diagram of an alternative embodiment of a wireless device 16 configured according to principles set forth herein. The memory module 45 is configured to store the control channel 28. The even sample sampling module 49 is configured to sample even samples of the base sequence. The sequence modulator module 51 is configured to modulate the sampled even samples with a binary phase shift keying, BPSK, symbol to create a first control channel sequence. The odd sample sampling module 53 is configured to perform a second sampling of odd samples of the base sequence to create a second control channel sequence. The frequency division multiplexing module 20 configured to frequency division multiplex the first and second control channel sequences to produce the control channel transmission.

Figure 8:
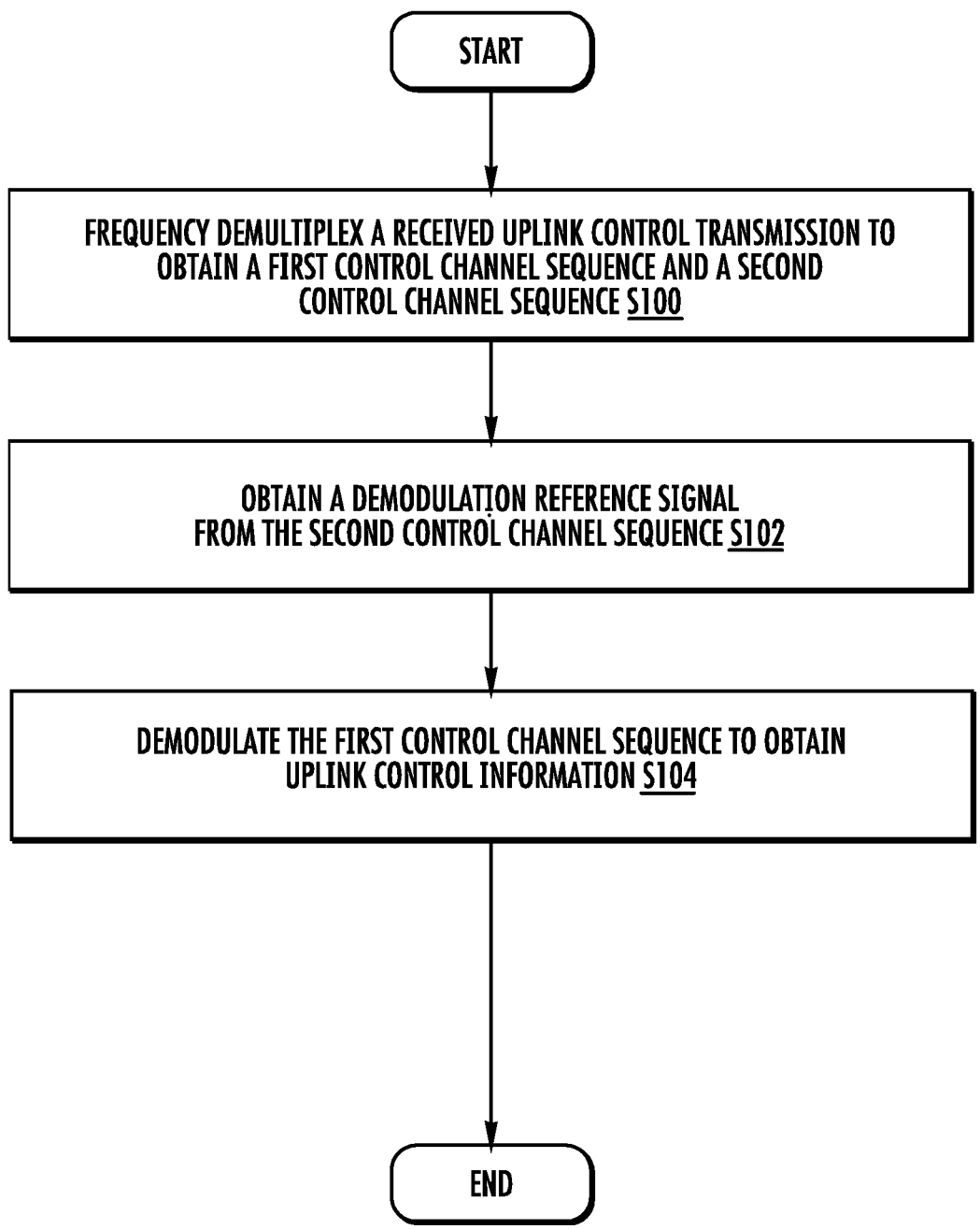
FIG. 8 is flowchart of an exemplary process in a network node for processing a received short PUCCH.

FIG. 8 is a flowchart of an exemplary process in a network node 14 for processing a received control channel according to principles set forth herein. The process includes frequency de-multiplexing, via frequency division de-multiplexer 18, a received control channel to obtain a first control channel sequence and a second control channel sequence (block S100). The process also includes obtaining, via the DM-RS obtainer unit, a demodulation reference signal, DM-RS, from the second control channel sequence (block S102). The process also includes demodulating, via the demodulator 30, the first control channel sequence to obtain uplink control information (block S104). After the demultiplexing the obtained DMRS signal can be used to estimate the channel from which coherent demodulation of the UCI can be achieved.

Figure 9:
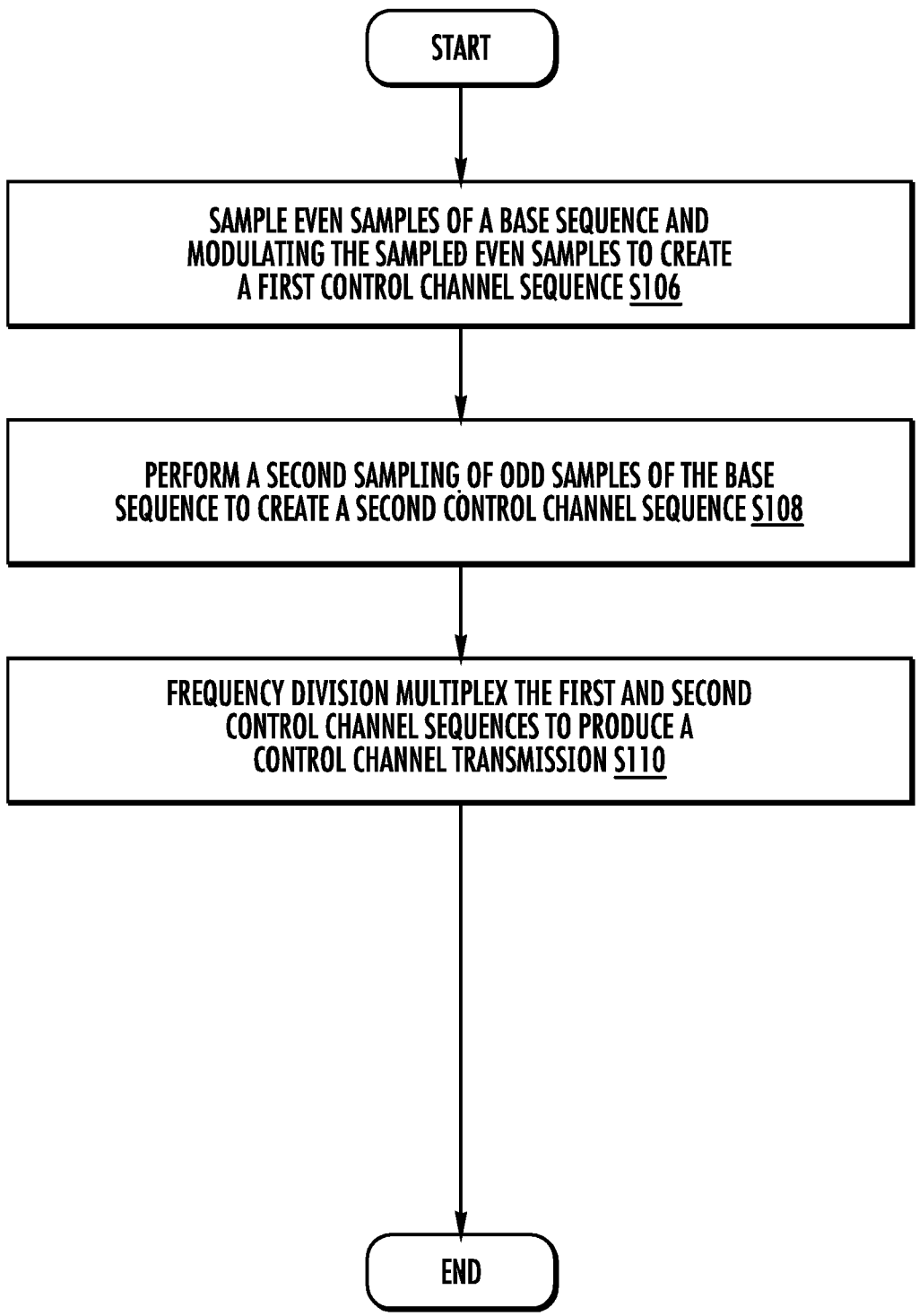
FIG. 9 is flowchart of an exemplary process in a wireless device for generating a short PUCCH.

FIG. 9 is a flowchart of an exemplary process in a wireless device 16 for providing a control channel having two multiplexed bit sequences based on a base sequence. The process includes sampling, via the even sample sampler 48, even samples of the base sequence and modulating, via the sequence modulator 50, the sampled even samples to create a first control channel sequence (block S106). The process also includes performing a second sampling, via the odd sample sampler 52, of odd samples of the base sequence to create a second control channel sequence (block S108). The process also includes frequency division multiplexing, via the frequency division multiplexer 20, the first and second control channel sequences to produce the control channel transmission (block S110).

Having described the general process flow of arrangements of the disclosure and having provided examples of hardware and software arrangements for implementing the processes and functions of the disclosure, the sections below provide details and examples of arrangements for generating and processing a received control channel according to principles set forth herein.

Some embodiments provide a short PUCCH with low PAPR/CM combined with coherent demodulation for improved performance on highly dispersive channels for 1 or 2 bit payloads. First, details of the sPUCCH format for 1 bit UCI are described. The modifications needed for 2 bits UCI are described thereafter. In both cases it is assumed that the frequency allocation of short PUCCH spans 1 PRB of 12 subcarriers. It should be apparent to those skilled in the art that the principle can be extended to transmission of the short PUCCH over other numbers of subcarriers.

With a desirable DM-RS overhead of one half, two FDM sequences denoted S1 and S2 may be created where:
S1 is a length-6 sequence for UCI on every even subcarrier, i.e., index [0, 2, 4, 6, 8, 10]
S2 is a length-6 sequence for DM-RS on every odd subcarrier, i.e., index [1, 3, 5, 7, 9, 11]Let S(k), k=0, 1, . . . , 11, denote one of the 30 computer optimized length-12 base sequences specified in LTE for DM-RS with the wireless device (WD)-specific assigned cyclic shift included.

By sampling every even numbered sample of S(k), the length-6 sequence U(k)=S(2*k), for k=0, 1, . . . , 5 is obtained. The sequence S1($k$) may be created by modulating U(k) by a binary phase shift keyed (BPSK) symbol X=±1 whose sign depends on the 1 bit UCI. Similarly, the sequence S2($k$) may be formed by sampling every odd numbered sample of S(k), i.e., S2($k$)=S(2*k+1), k=0, 1, . . . , 5 which hence, constitutes the DM-RS.

Figure 10:
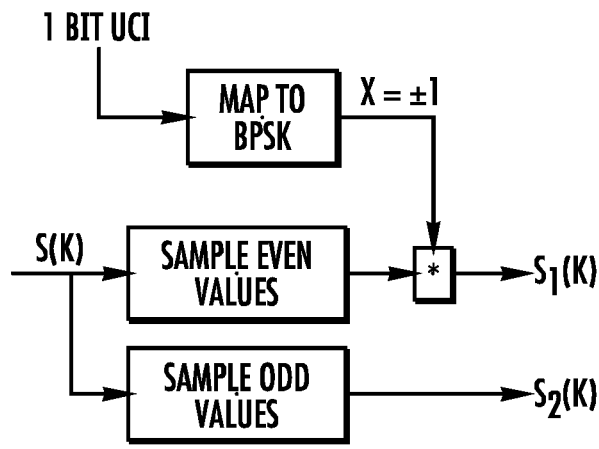
FIG. 10 is a block diagram of a process for generating two sequences from a base sequence, one of the two sequences being modulated by a single bit UCI.
Figure 11:
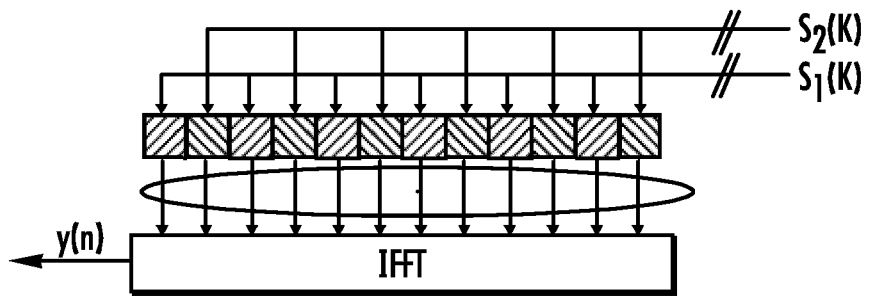
FIG. 11 is an illustration of frequency division multiplexing of two sequences.

FIG. 10 illustrates, using basic building blocks, the method for creating the two sequences, while FIG. 11 illustrates the frequency division multiplexing (FDM) of the sequences, i.e., their placement in the frequency domain and their inverse fast Fourier transform (IFFT) to the time domain.

To show that the method obtains the same low PAPR/CM as with the original length-12 computer optimized sequence S(k), note that:
Y(k)=S(k), k=0, 1, . . . , 11, if X=+1
Y(k)=(−1)*exp(j*π*k)*S(k)=(−1)*exp(j*2π*k*6/12)*S (k), k=0, 1, . . . , 11, if X=−1
In the time domain, after the IFFT, there subsequently is
y(n)=s(n), n=0, 1, . . . , 11, if X=+1
y(n)=(−1)*s((n−6)12), n=0, 1, . . . , 11, if X=−1
Thus, the composite transmit signal in the time domain, y(n), is either the original DM-RS sequence (including the assigned CS) or a cyclic shifted version of it, depending on the value X. Since the circular shifting does not change the PAPR/CM, it can be concluded that the low CM/PAPR of the original length-12 sequence is maintained.

Figure 12:
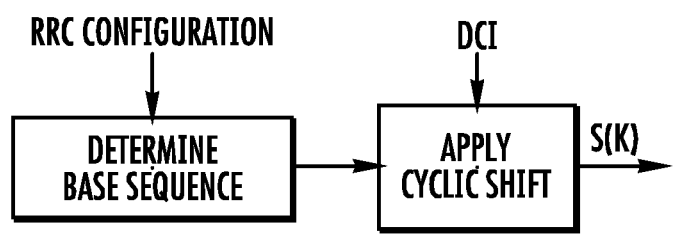
FIG. 12 illustrates generation of a base cyclic shift in downlink control information (DCI)

Which of the 30 base sequences of LTE to use as the base sequence is typically cell-specific and semi-statistically configured by radio resource control (RRC), while the WD-specific cyclic shift is typically dynamically signaled (as-signed) to the WD 16 via the downlink control information (DCI). This is illustrated in FIG. 12.

NR short PUCCH for 1-2 bits UCI

An extension of the method described above for 1 bit UCI may be applied for the 2 bits UCI by replacing the BPSK symbol with a QPSK symbol. However, this would increase the PAPR/CM. To circumvent this problem, some embodiments provide the following methods for conveying the 2 bits UCI which can be also used for 1 UCI bit when needed while preserving the low PARP/CM as described above.

Embodiment 1

Figure 13:
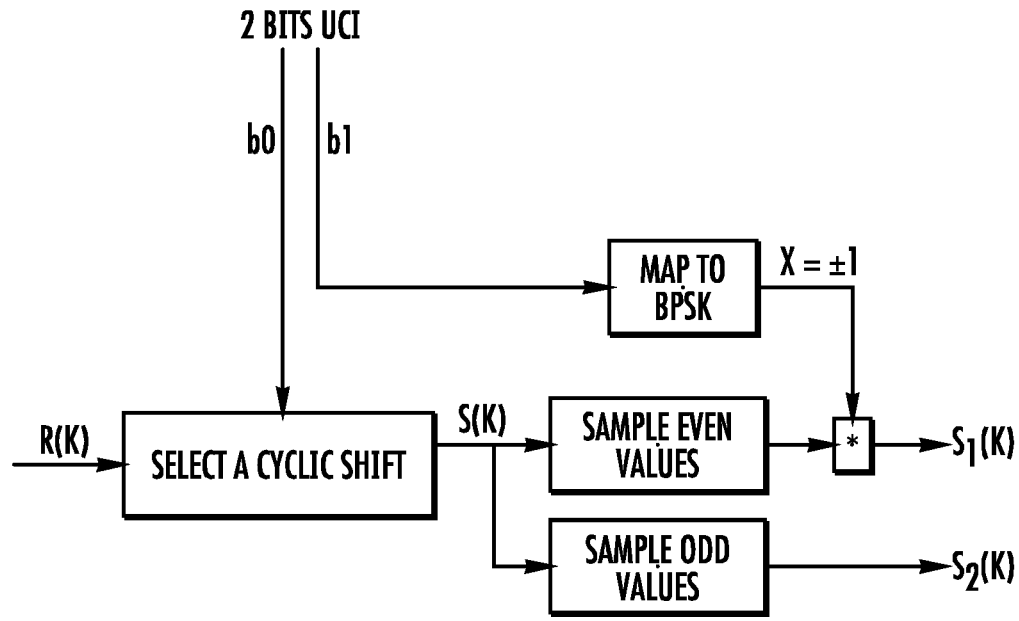
FIG. 13 is a block diagram of a process for generating two sequences based on cyclic shift selected by a first bit of UCI and modulation by a second bit of UCI.

In one embodiment, two cyclic shifts of a base sequence R(k) that is configured to the WD 16 via the RRC signaling may be assigned to one WD 16. The value of the first bit of the 2-bits UCI may be used to determine one out of the two allocated cyclic shifts {CS0, CS1}, e.g., first bit 0→CS0, first bit 1→CS1. Given the determined cyclic shift, the above-described method may be applied to create the sequences S1 and S2 where now the second bit of the 2-bits of UCI determines the BPSK symbol X. Alternatively, the second bit of the 2-bit UCI can be used to determine the cyclic shift to use and the first bit can modulate sequence S_1 ($k$). This embodiment is illustrated in FIG. 13.

Embodiment 1.1

Signaling of the cyclic shifts of the base sequence and the base sequence via RRC and DCI The two cyclic shifts of the base sequence R(k) in the above embodiment may be assigned via RRC signaling and the cyclic shifts of this base sequence to be used can be controlled via the downlink control information. In one non-limiting exemplary embodiment, a base cyclic shift may be signaled in the DCI and said two cyclic shifts are obtained by adding one or two fixed shift values on the signaled shift. For one non-limiting example, said two cyclic shifts are s and s+1 when the DCI signaled a shift of s.

When X equals minus one, this is equivalent to a cyclic shift of 6. Therefore, as a feature of this embodiment, the cyclic shifts that are selected for the base sequence R (k) do not include a cyclic shift of 6, i.e., the two cyclic shifts assigned to the WD 16 will not be s and s+6.

In the case of single bit UCI, one of the allocated sequences in the WD 16 may be used as S(k). To determine the sequence for 1-bit UCI transmission, higher layer signaling or physical layer signaling as well as implicit rules can be used. Thereafter, the method described above of generating the two sequences S1 and S2 may be followed to create sequences S1 and S2 to be fed to the IFFT.

In above embodiments, it is assumed that the bit, b0, selects one cyclic shift out of the same base sequence or among two base sequences. However, in a more general case, b0 could select among two PUCCH resources. The two PUCCH resources could be the same base sequence and just differ in the cyclic shift, two different base sequences or in the more general case could be mapped to different frequencies and/or times and/or base sequences and/or cyclic shifts.

Embodiment 1.2—Signaling of the Cyclic Shifts of the Base Sequence and the Base Sequence Via RRC In this embodiment, the one or two cyclic shifts of the base sequence R(k) and the base sequence itself may be configured via RRC to the WD. This may be adequate when there are fewer WDs 16 in the system such that there are enough base sequence and cyclic shift combinations that may be assigned to all WDs 16 in the system so that there are no ambiguities regardless of the combination of WDs 16 that transmit at any particular time.

Embodiment 2

Figure 14:
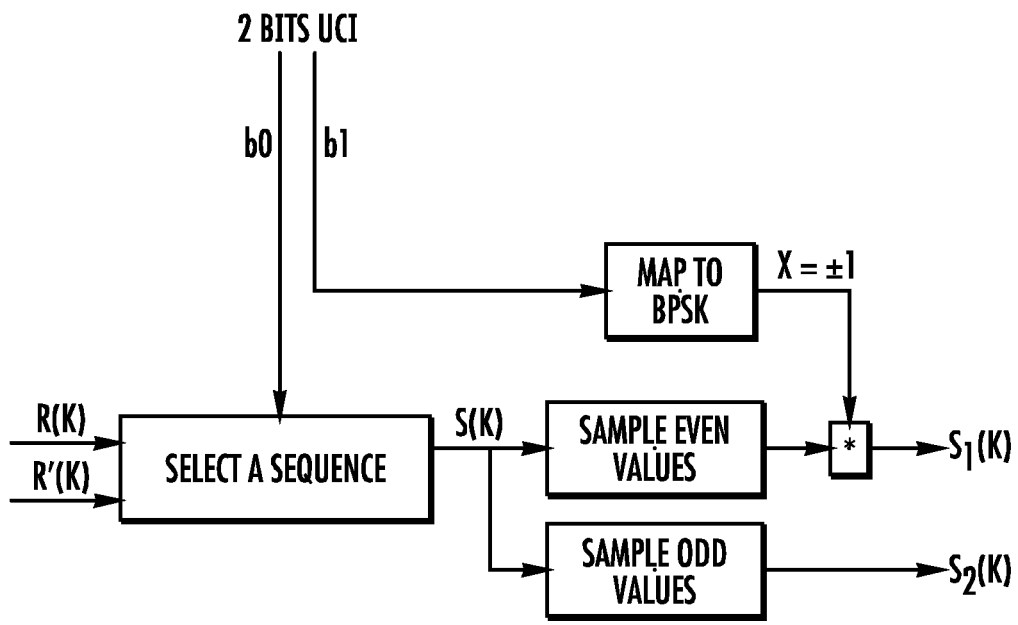
FIG. 14 is a block diagram of a process for generating sequences based on selected one of two base sequences.

In another embodiment, two base sequences R(k) and R'(k) may be configured for one WD 16 via RRC signaling. The one common shift or two different cyclic shifts to apply to said two base sequences can be signaled to the WD 16 in the downlink control information. From the 2-bit UCI, one of the bits may be used to determine which base sequence to use as sequence S(k) and the other bit may be used to modulate the S1 (k) sequence sampled from S(k). This is illustrated in FIG. 14.

Embodiment 2.1—Signaling of the Cyclic Shifts of the Base Sequences Via RRC and DCI The cyclic shifts of the two base sequences R(k) and R'(k) which are configured via RRC signaling can be further controlled via the downlink control information (DCI). In one non-limiting exemplary embodiment, one cyclic shift value may be signaled in the DCI and is applied to both sequences. In another non-limiting exemplary embodiment, two cyclic shift values may be signaled in the DCI for said two sequences.

In case of only single bit UCI, one of the allocated sequences of the WD 16 may be used as S(k). To determine the sequence for 1-bit UCI transmission, higher layer signaling or physical layer signaling as well as implicit rules can be used. Thereafter, the process described above for generating sequences S1 and S2 to be fed to the IFFT may be applied.

Embodiment 2.2—Signaling of the Cyclic Shifts of the Base Sequence Via RRC

In this non-limiting exemplary embodiment, no cyclic shift or base sequence values are signaled in DCI. Instead the base sequences, R(k) and R'(k), and cyclic shifts of the base sequences may be signaled only by RRC. This may be adequate when there are fewer WDs 16 in the system such that there are enough base sequence and cyclic shift combinations that may be assigned to all WDs 16 in the system so that there are no ambiguities regardless of the combination of WDs 16 that transmit at any particular time.

Embodiment 3

In general, a situation may occur where the gNB sends multiple physical downlink control channel (PDCCH) assignments and the WD 16 misses some of them. For instance, the gNB may transmit two PDCCH assignments for which the ACK was supposed to be received in the form of two bits transmitted together in a short PUCCH. The WD 16 may not receive one of the PDCCH assignments. In this case, the WD 16 may infer that it needs to transmit only one ACK bit unless it is explicitly instructed to transmit two bits via DCI signaling. This can lead to poor performance.

This is illustrated using the following example. As in the embodiment in Section 5.2.1, two cyclic shifts of the base sequence R(k) are assigned via RRC signaling and said two cyclic shifts are s and s+1 with the DCI signaling only a shift of s are used. An encoding of the acknowledged/non-acknowledged (ACK/NACK) information is shown in the table below.

| Cyclic shift of base sequence R(k) | ACK/NACK for first bit | ACK/NACK for second bit |
|---|---|---|
| s | NACK | ACK |
| s + 6 | NACK | NACK |
| s + 1 | ACK | ACK |
| s + 1 + 6 | ACK | NACK |

Consider the case where the gNB requests ACK/NACK information for two successively transmitted first physical downlink shared channels (PDSCHs) and the WD 16 receives only the PDSCH and misses the second one. The gNB then signals in the DCI the base sequence and a cyclic shift of s in the DCI so that the WD16 may use sequences with cyclic shifts of the base sequence R (k) with cyclic shifts of s and s+1. The WD 16 however, may only transmit one ACK/NACK bit for the first PDSCH by transmitting shifts of s or s+6. Thus, if the gNB receives the base sequence with shift of s it may assume that the first PDSCH was incorrectly received and that the second one was correctly received as is clear from the Table above. However, the WD 16 intended to indicate that the first PDSCH was correctly received whereas it has no information about a second PDSCH. Thus, the gNB may assume that a PDSCH that was completely missed by the WD 16 has been correctly received.

In this embodiment, to avoid the above problem, when two cyclic shifts or base sequences are not explicitly indicated in the DCI (so that the WD 16 unambiguously knows whether the gNB expects one or two bits of ACK/NACK feedback, an additional bit may be introduced to indicate whether one or two bits of ACK/NACK feedback is expected. This could still be more efficient in terms of DCI overhead than indicating one of more than 2 cyclic shifts for the second sequence to be used by the WD 16 when 2 bit feedback is desired.

Note on NR Terminology

NR terminology and LTE terminology coincide to a considerable extent. For instance, a resource element (RE) remains 1 subcarrier×1 OFDM symbol. Yet some terms known in LTE have been given a new meaning in NR. This disclosure, including the claims, may apply prefixes "LTE" and "NR" when indefiniteness could otherwise arise. Examples: An LTE subframe lasting 1 ms contains 14 OFDM symbols for normal CP. An NR subframe has a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference is made to the 3GPP TR 38.802 v14.0.0 standards document and later versions.

Any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible. Therefore, even though some embodiments of this disclosure have been described using LTE-originated terminology, they remain fully applicable to NR technology Some embodiments include a method in a wireless device 16 for providing information on a control channel. The method includes sampling even samples of base sequence and modulating the sampled even samples to create a first control channel sequence (block S106). The method includes performing a second sampling of odd samples of the base sequence to create a second control channel sequence (block S108). The method also includes frequency division multiplexing the first and second control channel sequences to produce the control channel transmission (block S110).

In some embodiments, the control channel is a short physical uplink control channel, sPUCCH, transmission. In some embodiments, the modulating of the sampled even samples is by a binary phase shift keying, BPSK, symbol. In some embodiments, the BPSK symbol corresponds to a first of two bits of an uplink control information, UCI, symbol. In some embodiments, a second bit of an uplink control information, UCI, having at least two bits determines one of two cyclic shifts of the base sequence. In some embodiments, the two cyclic shifts are based on a base cyclic shift received in downlink control information, DCI. In some embodiments, the base sequence is one of two base sequences selected by a bit of uplink control information, UCI, symbol. In some embodiments, the second control channel sequence includes a demodulation reference signal, DMRS.

Some embodiments include a wireless device 16 for providing information on a control channel. The wireless device 16 includes processing circuitry 42 configured to sample even samples of the base sequence and modulating the sampled even samples to create a first control channel sequence, perform a second sampling of odd samples of the base sequence to create a second control channel sequence and frequency division multiplex the first and second control channel sequences to produce the control channel transmission.

In some embodiments, the control channel transmission is a short physical uplink control channel, sPUCCH, transmission. In some embodiments, the modulating of the sampled even samples is by a binary phase shift keying, BPSK, symbol. In some embodiments, the BPSK symbol corresponds to a first of two bits of an uplink control information, UCI, symbol. In some embodiments, a second bit of an uplink control information, UCI, symbol having at least two bits determines one of two cyclic shifts of the base sequence. In some embodiments, the two cyclic shifts are based on a base cyclic shift received in downlink control information, DCI. In some embodiments, the base sequence is one of two base sequences selected by a bit of uplink control information, UCI, symbol. In some embodiments, the second control channel sequence includes a demodulation reference signal, DMRS.

Some embodiments include a wireless device 16 for providing information on a control channel having two multiplexed bit sequences based on a base sequence. The wireless device 16 includes an even sample sampling module 49 configured to sample even samples of the base sequence and modulating the sampled even samples to create a first control channel sequence. The wireless device 16 includes an odd sample sampling module 51 configured to perform a second sampling of odd samples of the base sequence to create a second control channel sequence. The wireless device 16 also includes a frequency division multiplexing module configured to frequency division multiplex the first and second control channel sequences to produce the control channel transmission.

Some embodiments include a method in a network node 14 configured to process a received uplink control channel. The method includes frequency de-multiplexing a received control channel transmission to obtain a first control channel sequence and a second control channel sequence (block S100). The method includes obtaining a demodulation reference signal, DM-RS, from the second control channel sequence (block S102). The method also includes demodulating the first control channel sequence to obtain uplink control information (block S104). After the demultiplexing the obtained DMRS signal can be used to estimate the channel from which coherent demodulation of the UCI can be achieved.

In some embodiments, the uplink control channel transmission is a short physical uplink control channel, sPUCCH, transmission. In some embodiments, the first sequence is modulated by a binary phase shift keying, BPSK, symbol. In some embodiments, a first of two bits of the uplink control information, UCI, corresponds to a BPSK symbol. In some embodiments, a second bit of an uplink control information, UCI, symbol having at least two bits determines one of two cyclic shifts of a base sequence. In some embodiments, the base sequence is one of two base sequences selected by a bit of uplink control information, UCI. In some embodiments, the method further includes transmitting a base cyclic shift in downlink control information, the base cyclic shift used by a wireless device 16 to perform a cyclic shift of at least one of the first and second control channel sequences.

Some embodiments include a network node 14 configured to process a received uplink control channel transmission. The network node 14 includes processing circuitry 26 configured to frequency division de-multiplex a received control channel transmission to obtain a first control channel sequence and a second control channel sequence, obtain a demodulation reference signal, DM-RS, from the second control channel sequence and demodulate the first control channel sequence to obtain uplink control information. After the demultiplexing the obtained DMRS signal can be used to estimate the channel from which coherent demodulation of the UCI can be achieved.

In some embodiments, the uplink control channel transmission is a short physical uplink control channel, sPUCCH, transmission. In some embodiments, the first control channel sequence is modulated by a binary phase shift keying, BPSK, symbol. In some embodiments, a first of two bits of the uplink control information, UCI, corresponds to a BPSK symbol. In some embodiments, a second bit of an uplink control information, UCI, symbol having at least two bits determines one of two cyclic shifts of a base sequence. In some embodiments, the base sequence is one of two base sequences selected by a bit of uplink control information, UCI, symbol. In some embodiments, the processing circuitry is further configured to transmit a base cyclic shift in downlink control information, the base cyclic shift used by a wireless device 16 to perform a cyclic shift of at least one of the first and second control channel sequences.

Some embodiments include a network node 14 configured to process a received control channel transmission. The network node 14 includes a frequency division de-multiplexing module 19 configured to frequency de-multiplex a received sPUCCH to obtain a first control channel sequence and a second control channel sequence. The network node 14 includes a demodulator module 31 configured to demodulate the first control channel sequence to obtain uplink control information. The network node 14 also includes a demodulation reference signal, DM-RS, obtainer module 33 configured to obtain a DM-RS from the second control channel sequence.

Some embodiments include the following:

Embodiment 1

A method in a wireless device for providing a short physical uplink control channel, sPUCCH, having two multiplexed bit sequences based on a base sequence, the method comprising:
sampling even samples of the base sequence and modulating the sampled even samples with a binary phase shift keying, BPSK, symbol to create a first sequence;
performing a second sampling of odd samples of the base sequence to create a second sequence; and
frequency division multiplexing the first and second sequences to produce the sPUCCH.

Embodiment 2

The method of Embodiment 1, wherein the BPSK symbol is a first of two bits of an uplink control information, UCI, symbol.

Embodiment 3

The method of any of Embodiments 1 and 2, wherein a second bit of an uplink control information, UCI, determines one of two cyclic shifts of the base sequence.

Embodiment 4

The method of any of Embodiments 1-3, wherein the two cyclic shifts are based on a base cyclic shift received in downlink control information, DCI.

Embodiment 5

The method of Embodiment 1, wherein the base sequence is one of two base sequences selected by a bit of uplink control information, UCI.

Embodiment 6

A wireless device for providing a short physical uplink control channel, sPUCCH, having two multiplexed bit sequences based on a base sequence, the wireless device comprising:
processing circuitry configured to:
sample even samples of the base sequence and modulating the sampled even samples with a binary phase shift keying, BPSK, symbol to create a first sequence;
perform a second sampling of odd samples of the base sequence to create a second sequence; and
frequency division multiplex the first and second sequences to produce the sPUCCH.

Embodiment 7

The wireless device of Embodiment 6, wherein the BPSK symbol is a first of two bits of an uplink control information, UCI, symbol.

Embodiment 8

The wireless device of any of Embodiments 6 and 7, wherein a second bit of an uplink control information, UCI, determines one of two cyclic shifts of the base sequence.

Embodiment 9

The wireless device of any of Embodiments 6-8, wherein the two cyclic shifts are based on a base cyclic shift received in downlink control information, DCI.

Embodiment 10

The wireless device of Embodiment 6, wherein the base sequence is one of two base sequences selected by a bit of uplink control information, UCI.

Embodiment 11

A wireless device for providing a short physical uplink control channel, sPUCCH, having two multiplexed bit sequences based on a base sequence, the wireless device comprising:
an even sample sampling module configured to sample even samples of the base sequence and modulating the sampled even samples with a binary phase shift keying, BPSK, symbol to create a first sequence;
an odd sample sampling module configured to perform a second sampling of odd samples of the base sequence to create a second sequence; and
a frequency division multiplexing module configured to frequency division multiplex the first and second sequences to produce the sPUCCH.

Embodiment 12

A method in a network node configured to process a received short physical uplink control channel, sPUCCH, the method comprising:
frequency de-multiplexing a received sPUCCH to obtain a first sequence and a second sequence;
obtaining a demodulation reference signal, DM-RS, from the second sequence and demodulating the first sequence to obtain uplink control information.

Embodiment 13

The method of Embodiment 12, further comprising transmitting a base cyclic shift in downlink control information, the base cyclic shift used by a wireless device to perform a cyclic shift of at least one of the first and second sequences.

Embodiment 14

A network node configured to process a received short physical uplink control channel, sPUCCH, the network node comprising:
processing circuitry configured to:
frequency division de-multiplex a received sPUCCH to obtain a first sequence and a second sequence;
obtain a demodulation reference signal, DM-RS, from the second sequence and demodulate the first sequence to obtain uplink control information.

Embodiment 15

The network node of Embodiment 14, wherein the processing circuitry is further configured to transmit a base cyclic shift in downlink control information, the base cyclic shift used by a wireless device to perform a cyclic shift of at least one of the first and second sequences.

Embodiment 16

A network node configured to process a received short physical uplink control channel, sPUCCH, the network node comprising:
- a frequency division de-multiplexing module configured to frequency de-multiplex a received sPUCCH to obtain a first sequence and a second sequence;
- a demodulator module configured to demodulate the first sequence to obtain uplink control information; and
- a demodulation reference signal, DM-RS, obtainer module configured to obtain a DM-RS from the second sequence.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

As described above, in an alternative implementation the first control sequence may be obtained from odd samples of a base sequence and the second control sequence obtained from even samples of the base sequence. The following provides example embodiments to illustrate the alternative.

Example 1

A method in a wireless device (16) for providing information on a control channel, the method comprising:
- sampling (S106) odd samples of a base sequence and modulating the sampled odd samples to create a first control channel sequence;
- performing (S108) a second sampling of even samples of the base sequence to create a second control channel sequence; and
- frequency division multiplexing (S110) the first and second control channel sequences to produce a control channel transmission.

Example 2

The method of Example 1, wherein the control channel transmission is a short physical uplink control channel, sPUCCH transmission.

Example 3

The method of any of Examples 1 and 2, wherein the modulating of the sampled odd samples is by a binary phase shift keying, BPSK, symbol.

Example 4

The method of Example 3, wherein the BPSK symbol corresponds to a first of two bits of an uplink control information, UCI, symbol.

Example 5

The method of any of Examples 1-4, wherein a second bit of an uplink control information, UCI, symbol having at least two bits determines one of two cyclic shifts of the base sequence.

Example 6

The method of Example 5, wherein the two cyclic shifts are based on a base cyclic shift received in downlink control information, DCI.

Example 7

The method of Example 1, wherein the base sequence is one of two base sequences selected by a bit of an uplink control information, UCI, symbol.

Example 8

The method of Example 1, wherein the second control channel sequence includes a demodulation reference signal, DMRS.

Example 9

A wireless device (16) for providing information on a control channel the wireless device (16) comprising:
processing circuitry (42) configured to:
sample odd samples of the base sequence and modulate the sampled odd samples to create a first control channel sequence;
perform a second sampling of even samples of the base sequence to create a second control channel sequence; and
frequency division multiplex the first and second control channel sequences to produce the control channel transmission.

Example 10

The wireless device (16) of Example 9, wherein the control channel transmission is a short physical uplink control channel, sPUCCH transmission.

Example 11

The wireless device (16) of any of Examples 9 and 10, wherein the modulating of the sampled odd samples is by a binary phase shift keying, BPSK, symbol

Example 12

The wireless device (16) of Example 11, wherein the BPSK symbol corresponds to a first of two bits of an uplink control information, UCI, symbol.

Example 13

The wireless device (16) of any one of Examples 9-11, wherein a second bit of an uplink control information, UCI, symbol having at least two bits determines one of two cyclic shifts of the base sequence.

Example 14

The wireless device (16) of Example 13, wherein the two cyclic shifts are based on a base cyclic shift received in downlink control information, DCI.

Example 15

The wireless device (16) of Example 14, wherein the base sequence is one of two base sequences selected by a bit of an uplink control information, UCI, symbol.

Example 16

The wireless device (16) of Example 9, wherein the second control channel sequence includes a demodulation reference signal, DMRS.

Example 17

A method in a network node (14) configured to process a received uplink control channel transmission, the method comprising:
frequency de-multiplexing (S100) a received uplink control channel transmission to obtain a first control channel sequence and a second control channel sequence;
obtaining (S102) a demodulation reference signal, DM-RS, from the second control channel sequence; and
demodulating (S104) the first control channel sequence to obtain uplink control information, UCI.

Example 18

The method of Example 17, wherein the uplink control channel transmission is a short physical uplink control channel, sPUCCH, transmission.

Example 19

The method of any one of Examples 17 and 18, wherein the first control channel sequence is modulated by a binary phase shift keying, BPSK, symbol.
20. The method of Example 19, wherein a first of two bits of the uplink control information, UCI, corresponds to a BPSK symbol.

Example 21

The method of any one of Examples 17-20, wherein a second bit of an uplink control information, UCI, symbol having at least two bits determines one of two cyclic shifts of a base sequence.

Example 22

The method of Example 21, wherein the base sequence is one of two base sequences selected by a bit of uplink control information, UCI.

Example 23

The method of Example 22, further comprising transmitting a base cyclic shift in downlink control information, the base cyclic shift used by a wireless device (16) to perform a cyclic shift of at least one of the first and second control channel sequences.

Example 24

A network node (14) configured to process a received control channel transmission, the network node (14) comprising:
processing circuitry (22) configured to:
frequency division de-multiplex a received control channel transmission to obtain a first control channel sequence and a second control channel sequence;
obtain a demodulation reference signal, DM-RS, from the second control channel sequence; and
demodulate the first control channel sequence to obtain uplink control information.

Example 25

The network node (14) of Example 24, wherein the uplink control channel transmission is a short physical uplink control channel, sPUCCH, transmission.

Example 26

The network node (14) of any one of Examples 24 and 25, wherein the first control channel sequence is modulated by a binary phase shift keying, BPSK, symbol.

Example 27

The network node (14) of Example 24, wherein a first of two bits of the uplink control information, UCI, corresponds to a BPSK symbol.

Example 28

The network node (14) of any one of Examples 24-27, wherein a second bit of an uplink control information, UCI, symbol having at least two bits determines one of two cyclic shifts of a base sequence.

Example 29

The network node (14) of Example 28, wherein the base sequence is one of two base sequences selected by a bit of an uplink control information, UCI, symbol.

Example 30

The network node (14) of Example 29, wherein the processing circuitry is further configured to transmit a base cyclic shift in downlink control information, the base cyclic shift used by a wireless device (16) to perform a cyclic shift of at least one of the first and second control channel sequences.

Example 31

A computer program, program product or computer readable storage medium comprising instructions which when executed on a computer perform any one of the methods of Examples 1 to 8.

Example 33

A computer program, program product or computer readable storage medium comprising instructions which when executed on a computer perform any one of the methods of Examples 17 to 23.

| Abbreviation | Explanation |
| --- | --- |
| CAZAC | Constant Amplitude Zero Autocorrelation |
| CDM | Code Division Multiplex |
| DCI | Downlink Control Information |
| DFT | Discrete Fourier Transform |
| DM-RS | Demodulation Reference Signal |
| FDM | Frequency Division Multiplex |
| HARQ | Hybrid Automatic Repeat Request |
| OFDM | Orthogonal Frequency Division Multiplex |
| PAPR | Peak to Average Power Ratio |
| PUCCH | Physical Uplink Control Channel |
| PRB | Physical Resource Block |
| RRC | Radio Resource Control |
| UCI | Uplink Control Information |

The invention claimed is:

1. A method performed by a wireless device for providing information on a control channel, the method comprising:
performing a first sampling of one of even samples or odd samples of a base sequence and modulating the sampled one of the even samples or the odd samples of the first sampling in part to determine a first control channel sequence;
performing a second sampling of the other of the odd or even samples of the base sequence in part to determine a second control channel sequence;
frequency division multiplexing the first and second control channel sequences in part to determine a control channel transmission, the control channel transmission comprising an uplink control information, UCI, symbol having at least two bits, a first bit of the at least two bits determining one of two cyclic shifts of the base sequence, a second bit of the UCI symbol determining a binary phase shift keying, BPSK, symbol, the modulating of the samples for the first control channel sequence being by the binary phase shift keying, BPSK, symbol;
the second control channel sequence including a demodulation reference signal, DMRS; and
determining the control channel transmission based at least in part on the frequency division multiplexing of the first and second control channel sequences.

2. The method of claim 1, wherein the control channel transmission is a short physical uplink control channel, sPUCCH, transmission.

3. The method of claim 1, wherein the second bit of the UCI symbol corresponds to the BPSK symbol.

4. The method of claim 1, wherein the two cyclic shifts are based on a base cyclic shift received in downlink control information, DCI.

5. The method of claim 1, wherein the base sequence is one of two base sequences selected by another bit of the uplink control information, UCI, symbol.

6. A wireless device for providing information on a control channel, the wireless device comprising:
processing circuitry configured to:
perform a first sampling of one of even samples or odd samples of the base sequence and modulate the sampled one of even samples or odd samples of the first sampling in part to determine a first control channel sequence;
perform a second sampling of odd samples of the base sequence in part to determine a second control channel sequence;
frequency division multiplex the first and second control channel sequences in part to determine the control channel transmission, a first bit of the control channel transmission comprising an uplink control information, UCI, symbol indicating having at least two bits, a first bit of the at least two bits determining one of two cyclic shifts of the base sequence, a second bit of the UCI symbol determining a binary phase shift keying, BPSK, symbol, the modulating of the samples for the first control channel sequence being by the binary phase shift keying, BPSK, symbol;
the second control channel sequence including a demodulation reference signal, DMRS; and
determine the control channel transmission based at least in part on the frequency division multiplexing of the first and second control channel sequences.

7. The wireless device of claim 6, wherein the control channel transmission is a short physical uplink control channel, sPUCCH, transmission.

8. The wireless device of claim 6, wherein the second bit of the UCI symbol corresponds to the BPSK symbol.

9. The wireless device of claim 6, wherein the two cyclic shifts are based on a base cyclic shift received in downlink control information, DCI.

10. The wireless device of claim 9, wherein the base sequence is one of two base sequences selected by another bit of the UCI symbol.

11. A method performed by a network node configured to process a received uplink control channel transmission, the method comprising:
frequency de-multiplexing a received uplink control channel transmission to obtain a first control channel sequence and a second control channel sequence, the first and the second control channel sequences being associated with a base sequence, the first control channel sequence being based at least in part on a first sampling of one of even samples or odd samples of the base sequence and a modulation of the first sampling, the second control channel sequence being based at least in part on a second sampling of the other of the odd or even samples of the base sequence;
obtaining a demodulation reference signal, DM-RS, from the second control channel sequence; and
demodulating the first control channel sequence to obtain uplink control information, UCI, the UCI including at least two bits, a first bit of the UCI indicating one of two cyclic shifts of the base sequence, a second bit of the UCI indicating a binary phase shift keying, BPSK, symbol, the modulating of the samples of the first control channel sequence being by the binary phase shift keying, BPSK, symbol.

12. The method of claim 11, wherein the uplink control channel transmission is a short physical uplink control channel, sPUCCH, transmission.

13. The method of claim 11, wherein the second bit of the UCI corresponds to the BPSK symbol.

14. The method of claim 11, further comprising transmitting a base cyclic shift in downlink control information, the base cyclic shift being configured to be used by a wireless device to perform a cyclic shift of at least one of the first and second control channel sequences.

15. A network node configured to process a received control channel transmission, the network node comprising:
processing circuitry configured to:
frequency division de-multiplex a received control channel transmission to obtain a first control channel sequence and a second control channel sequence, the first and the second control channel sequences being associated with a base sequence, the first control channel sequence being based at least in part on a first sampling of one of even samples or odd samples of the base sequence and a modulation of the even samples of the first sampling, the second control channel sequence being based at least in part on a second sampling of odd samples of the base sequence;
obtain a demodulation reference signal, DM-RS, from the second control channel sequence; and
demodulate the first control channel sequence to obtain uplink control information, UCI, the UCI including at least two bits, a first bit of the UCI indicating one of two cyclic shifts of the base sequence, a second bit of the UCI indicating a binary phase shift keying, BPSK, symbol, the modulating of the samples of the first control channel sequence being by the binary phase shift keying, BPSK, symbol.

16. The network node of claim 15, wherein the uplink control channel transmission is a short physical uplink control channel, sPUCCH, transmission.

17. The network node of claim 15, wherein the second bit of the UCI corresponds to the BPSK symbol.

18. The network node of claim 15, wherein the processing circuitry is further configured to transmit a base cyclic shift in downlink control information, the base cyclic shift being configured to be used by a wireless device to perform a cyclic shift of at least one of the first and second control channel sequences.

* * * * *